(12) United States Patent
Leray et al.

(10) Patent No.: US 6,216,744 B1
(45) Date of Patent: Apr. 17, 2001

(54) MULTILAYER HOSE FOR TRANSPORTING CHEMICALS HAVING A HIGH SOLVENT CONTENT

(75) Inventors: Fabrice Leray, Maison en Champagne; Frédéric Maitay; Philippe Peyrat, both of Vitry le Francois, all of (FR)

(73) Assignee: Tricoflex SA, Rueil Malmaison (FR)

( * ) Notice: Subject to any disclaimer, the term of this patent is extended or adjusted under 35 U.S.C. 154(b) by 0 days.

(21) Appl. No.: 09/437,218

(22) Filed: Nov. 10, 1999

(30) Foreign Application Priority Data

Nov. 17, 1998 (FR) .................................................. 98 14388

(51) Int. Cl.⁷ ..................................................... F16L 11/00
(52) U.S. Cl. ......................... 138/125; 138/140; 138/137; 138/153; 138/141
(58) Field of Search ..................................... 138/125, 126, 138/137, 140, 141, 143, 153, 172

(56) References Cited

U.S. PATENT DOCUMENTS

| | | | |
|---|---|---|---|
| 5,167,259 | * 12/1992 | Brunnhofer | 138/125 X |
| 5,264,262 | * 11/1993 | Igarashi | 138/125 |
| 5,348,779 | * 9/1994 | Igarashi | 138/125 X |
| 5,419,861 | * 5/1995 | Verzaro | 264/82 |
| 5,622,210 | * 4/1997 | Crisman et al. | 138/125 X |
| 5,706,865 | * 1/1998 | Douchet | 138/125 |
| 5,937,911 | * 8/1999 | Kodama et al. | 138/125 X |

\* cited by examiner

*Primary Examiner*—Patrick Brinson
(74) *Attorney, Agent, or Firm*—Birch, Stewart, Kolasch & Birch, LLP

(57) ABSTRACT

A multilayer hose made of plastics material for transporting highly solvent chemicals such as paint, the hose including, from the inside to the outside, a polyamide/polyolefin alloy layer, a polyurethane-based adhesive layer, a flexible plasticized layer of polyvinyl chloride, and tubular reinforcement in contact with the polyvinyl chloride.

9 Claims, 1 Drawing Sheet

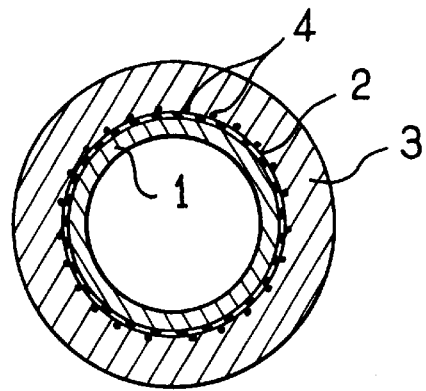
FIG_1
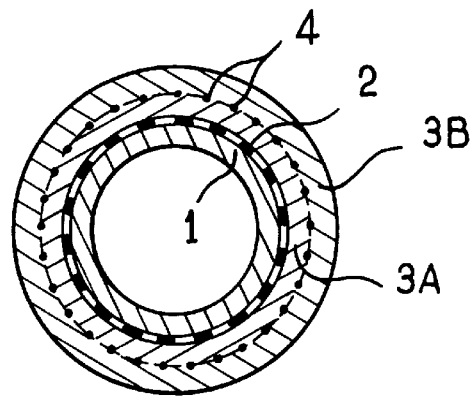
FIG_2
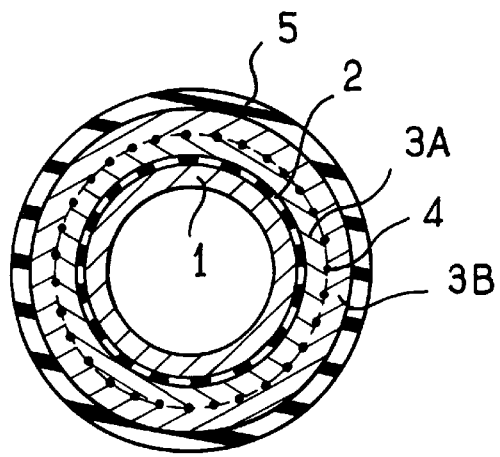
FIG_3

MULTILAYER HOSE FOR TRANSPORTING CHEMICALS HAVING A HIGH SOLVENT CONTENT

The present invention relates to a multilayer hose for transporting highly solvent chemicals and more particularly for transporting paint.

BACKGROUND OF THE INVENTION

Compared with a metal pipe, a pipe made of plastics material has the advantage of being more flexible and much lighter in weight.

However, plastics material does not have all the qualities of a metal pipe, in particular with regard to its chemical resistance to the medium that it is to convey and to its ability to withstand pressure or aggressive agents from the outside atmosphere.

Much research has led to numerous plastics material compositions for hoses being proposed for this type of application. Some of those hoses achieve excellent qualities in terms of chemical resistance or of resistance to corrosion, but they use very high quality materials and they are thus very costly. The cost of those hoses is not adapted to the price the market will bear.

OBJECTS AND SUMMARY OF THE INVENTION

The present invention proposes a hose structure which has all the strength and barrier qualities of hoses made of high quality material without having the drawback of high cost.

To this end, an object of the invention is thus to provide a multilayer hose made of plastics material for transporting highly solvent chemicals such as paint, the hose including, from the inside to the outside, a polyamide/polyolefin alloy layer, a polyurethane-based adhesive layer, a flexible plasticized layer of polyvinyl chloride, and tubular reinforcement in contact with the polyvinyl chloride.

Tests have shown that the internal layer constitutes an effective barrier against the solvents present in paint while presenting good mechanical strength in particular as a function of the temperature. However, since this material, e.g. as known on the market under the name ORGALLOY (registered trademark), is a costly material, its thickness is limited in the invention to lie in the range 0.3 mm to 1 mm. In addition, in order to obtain a hose of good mechanical quality, it is proposed that the layer outside said internal layer should be essentially a plasticized polyvinyl chloride which is low in cost and highly flexible.

To ensure that said layer of PVC bonds to the layer of polyamide/polyolefin alloy, the thinnest possible layer, i.e. a layer that is approximately 0.2 mm thick, of polyurethane and more particularly of polyurethane ester, is disposed therebetween.

Finally, in order that the hose thus constituted can mechanically withstand stresses to which it may be subjected, in particular internal pressure, it is possible to use reinforcement made of textile fibers or of metal (woven, braided, knitted . . . ), said reinforcement being disposed either at the interface between the PVC and the layer of polyurethane, or inside the layer of PVC, or outside the layer of PVC. When the reinforcement is placed inside the layer of PVC, manufacture by coextrusion requires two successive layers of PVC to be put in place, between which the reinforcement is placed. Wire reinforcement has the advantage of making the hose conductive and thus of being able to ensure the electrical continuity in a network of hoses for transporting paint, particularly in order to be able to control the flow of electric charge so as to minimize the risk of an electrical fire involving transported materials that are highly inflammable. It should also be noted that the nature of the reinforcement directly determines the breaking strength of the hose under the effect of internal pressure. By way of example, reinforcement formed by a simple wire or textile overing provides breaking strength against pressures no greater than 100 bars to 120 bars. If the covering is doubled, the strength may increase so as to withstand 250 bars. Finally, if the reinforcement is braided (simple, double . . . ), hoses can be manufactured that provide breaking strength against pressures of 600 bars to 1200 bars.

The plasticized polyvinyl chloride may optionally be cellular.

Optionally, the above-defined hose could have a final outside covering layer made from a polyurethane and designed to protect the hose from mechanical and chemical attack coming from the outside atmosphere. In an alternative method of manufacturing an electrically conductive hose, an outer covering layer made of electrically conductive polyurethane is chosen which combines, in a single layer, both the strength property of polyurethane and the property of allowing electrostatic charge to flow.

BRIEF DESCRIPTION OF THE DRAWING

Other characteristics and advantages of the invention appear from the description of embodiments given below by way of non-limiting example.

Reference is made to the accompanying drawing, in which:

FIG. 1 is a section view of a first embodiment of a hose of the invention; and

FIGS. 2 and 3 are section views of variants of the FIG. 1 embodiment.

MORE DETAILED DESCRIPTION

The method of manufacturing each of the variant embodiments of the hose of the invention is a well known coextrusion technique. The hose of FIG. 1 includes an inner layer 1 of an ORGALLOY type polyamide/polyolefin alloy. The thickness of said layer lies in the range 0.3 mm to 1 mm. The layer is surrounded by a thin layer of polyurethane and more precisely of polyurethane ester having a thickness of about 0.2 mm and which is the compound offering the best qualities for joining the inner layer of ORGALLOY to the outer layer 3 which is a polyvinyl chloride (PVC). The polyvinyl chloride has a thickness adapted to the inside diameter of the hose, e.g. lying in the range 1 mm to 5 mm. The plasticized PVC may optionally be cellular.

Before the PVC is extruded onto the layers 1 and 2, a wire reinforcing covering 4 of the wound round, braided, or knitted type is disposed, for example, on the layer 2. The function of this structure is to make the hose withstand internal pressure. Although in the case of FIG. 1 it is situated at the interface between the polyurethane and the PVC, in FIG. 2 said reinforcing covering 4 is situated between two layers 3A and 3B of PVC. If it is desired to embed the reinforcing structure 4 in a layer of PVC it is advisable to perform two successive extrusions of PVC so as to be able to dispose said layer between them.

FIG. 3 shows the hose of FIG. 2 covered by an outer layer 5 of flexible thermoplastics, and more precisely of polyurethane which imparts to the hose external protection against both chemical and mechanical corrosive agents in the outside atmosphere. As mentioned above, the polyurethane may be electrically conductive.

It is possible, in a variant not shown, to dispose the wire reinforcement as an outside layer of the hose so that it can be accessed externally, which is advantageous when said reinforcement is conductive.

What is claimed is:

1. A multilayer hose made of plastics material for transporting highly solvent chemicals such as paint, the hose including, from the inside to the outside, a polyamide/polyolefin alloy layer, a polyurethane-based adhesive layer, a flexible plasticized layer of polyvinyl chloride, and tubular reinforcement in contact with the polyvinyl chloride.

2. A hose according to claim 1, wherein the reinforcement is situated at the interface between the layer of polyurethane and the layer of polyvinyl chloride.

3. A hose according to claim 1, wherein the reinforcement is situated between a first layer of polyvinyl chloride and a second layer of polyvinyl chloride.

4. A hose according to claim 1, wherein the reinforcement is situated on the outer face of the layer of polyvinyl chloride.

5. A hose according to claim 1, wherein the reinforcement is wire-based.

6. A hose according to claim 1, wherein the layer(s) of polyvinyl chloride are cellular.

7. A hose according to claim 1, including a polyurethane-based outer layer.

8. A hose according to claim 7, wherein the outer layer is based on electrically conductive polyurethane.

9. A hose according to claim 1, wherein the inner layer is of thickness lying in the range 0.3 mm to 1 mm and the intermediate polyurethane layer is of thickness not greater than $2/10^{ths}$ of a millimeter.

* * * * *